(12) United States Patent
Cheng et al.

(10) Patent No.: US 11,585,410 B2
(45) Date of Patent: Feb. 21, 2023

(54) GEAR-SKIPPING PREVENTION MECHANISM

(71) Applicant: Coretronic Corporation, Hsin-Chu (TW)

(72) Inventors: Che-Ming Cheng, Hsin-Chu (TW); Chang-Yung Chen, Hsin-Chu (TW); Yi-Hsiung Peng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/469,902

(22) Filed: Sep. 9, 2021

(65) Prior Publication Data
US 2022/0120335 A1 Apr. 21, 2022

(30) Foreign Application Priority Data
Oct. 15, 2020 (CN) .......................... 202022293322.3

(51) Int. Cl.
*F16H 1/06* (2006.01)
*F16H 35/00* (2006.01)

(52) U.S. Cl.
CPC ......... *F16H 1/06* (2013.01); *F16H 2035/006* (2013.01); *G03B 2205/00* (2013.01)

(58) Field of Classification Search
CPC ...... F16H 35/00; F16H 1/06; F16H 2035/006; G03B 2205/00
USPC .......................................................... 74/414
See application file for complete search history.

(56) References Cited

U.S. PATENT DOCUMENTS

| | | | | |
|---|---|---|---|---|
| 2,622,451 A | * | 12/1952 | Bone ...................... | B61L 5/065 310/70 R |
| 2,823,561 A | * | 2/1958 | Opocensky ............ | G04B 1/205 475/331 |
| 2,844,038 A | * | 7/1958 | Danta ...................... | G05G 5/04 74/425 |
| 3,102,187 A | * | 8/1963 | Coscia ................. | B23K 9/0286 219/60 A |
| 3,461,735 A | * | 8/1969 | Durand ............. | F16H 57/02004 74/410 |
| 3,662,610 A | * | 5/1972 | Thoen ...................... | G05G 5/04 74/10.2 |
| 3,927,575 A | * | 12/1975 | Durand ............. | F16H 57/02004 74/411 |
| 4,071,961 A | * | 2/1978 | Dietzel ................. | F26B 11/022 432/103 |
| 4,258,583 A | * | 3/1981 | Weiss ................ | F16H 57/02004 74/411 |

FOREIGN PATENT DOCUMENTS

TW 201321827 6/2013

* cited by examiner

*Primary Examiner* — Jake Cook
(74) *Attorney, Agent, or Firm* — JCIPRNET

(57) ABSTRACT

A gear-skipping prevention mechanism including a first gear, a second gear, and a positioning member is provided. The first gear is sleeved on an axle. The second gear meshes with the first gear and has a first guiding groove. The positioning member includes at least one body and at least one engaging portion. Each of the at least one body has a sleeving hole. The sleeving hole is sleeved on the axle, and each of the at least one engaging portion is slidably disposed in the first guiding groove to limit a relative position between the first gear and the second gear.

8 Claims, 7 Drawing Sheets

GEAR-SKIPPING PREVENTION MECHANISM

CROSS-REFERENCE TO RELATED APPLICATION

This application claims the priority benefit of China application serial no. 202022293322.3, filed on Oct. 15, 2020. The entirety of the above-mentioned patent application is hereby incorporated by reference herein and made a part of this specification.

BACKGROUND

Technical Field

The disclosure relates to a gear mechanism, and in particular, to a gear-skipping prevention mechanism.

Description of Related Art

Generally, in a commercially available product with a lens device, such as a projector or a camera and the like, if an automatically-adjustable motor device is provided, a rigid member (e.g., a sheet metal piece) is used most of the time to fix the motor device onto the lens. The rigid member is then driven by gears, and the transmission distance between the two gears is then limited by the rigid member. Nevertheless, the motor device is required to be locked to the lens or next to the movement device through the rigid member, the volume of the entire lens is thereby increased. Moreover, processing is also required to achieve high accuracy to prevent the problem of an excessively large spacing or an excessively small spacing from occurring. If the gear module is excessively small and the rotating torque is excessively large, the gear skipping may occur. An additional positioning mechanism is therefore required to ensure that the distance between two gears is consistent when the gears move, so as to achieve a favorable transmission effect.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure provides a gear-skipping prevention mechanism capable of preventing gear skipping from occurring between two gears and achieving a small volume.

Other objects and advantages of the disclosure may be further illustrated by the technical features broadly embodied and described as follows.

In order to achieve one or a portion of or all of the objects or other objects, one embodiment of the disclosure is directed to a gear-skipping prevention mechanism including a first gear, a second gear, and a positioning member. The first gear is sleeved on an axle. The second gear meshes with the first gear and has a first guiding groove. The positioning member includes at least one body and at least one engaging portion. Each of the at least one body has a sleeving hole. The sleeving hole is sleeved on the axle, and each of the at least one engaging portion is slidably disposed in the first guiding groove to limit a relative position between the first gear and the second gear.

Based on the above, the embodiments of the disclosure have at least one of the following advantages or effects. In the gear-skipping prevention mechanism provided by the disclosure, the sleeving hole of body of the positioning member is sleeved on the axle sleeved by the first gear. Further, the engaging portion of the positioning member is slidably disposed in the first guiding groove of the second gear to accordingly limit the relative position between the first gear and the second gear. That is, in the gear-skipping prevention mechanism provided by the disclosure, the distance between the first gear and the second gear is fixed through the positioning member to prevent interference caused by an excessively small tooth spacing or to prevent gear skipping caused by an excessively large tooth spacing from occurring, and a small volume is also achieved.

Other objectives, features and advantages of the present disclosure will be further understood from the further technological features disclosed by the embodiments of the present disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the present disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
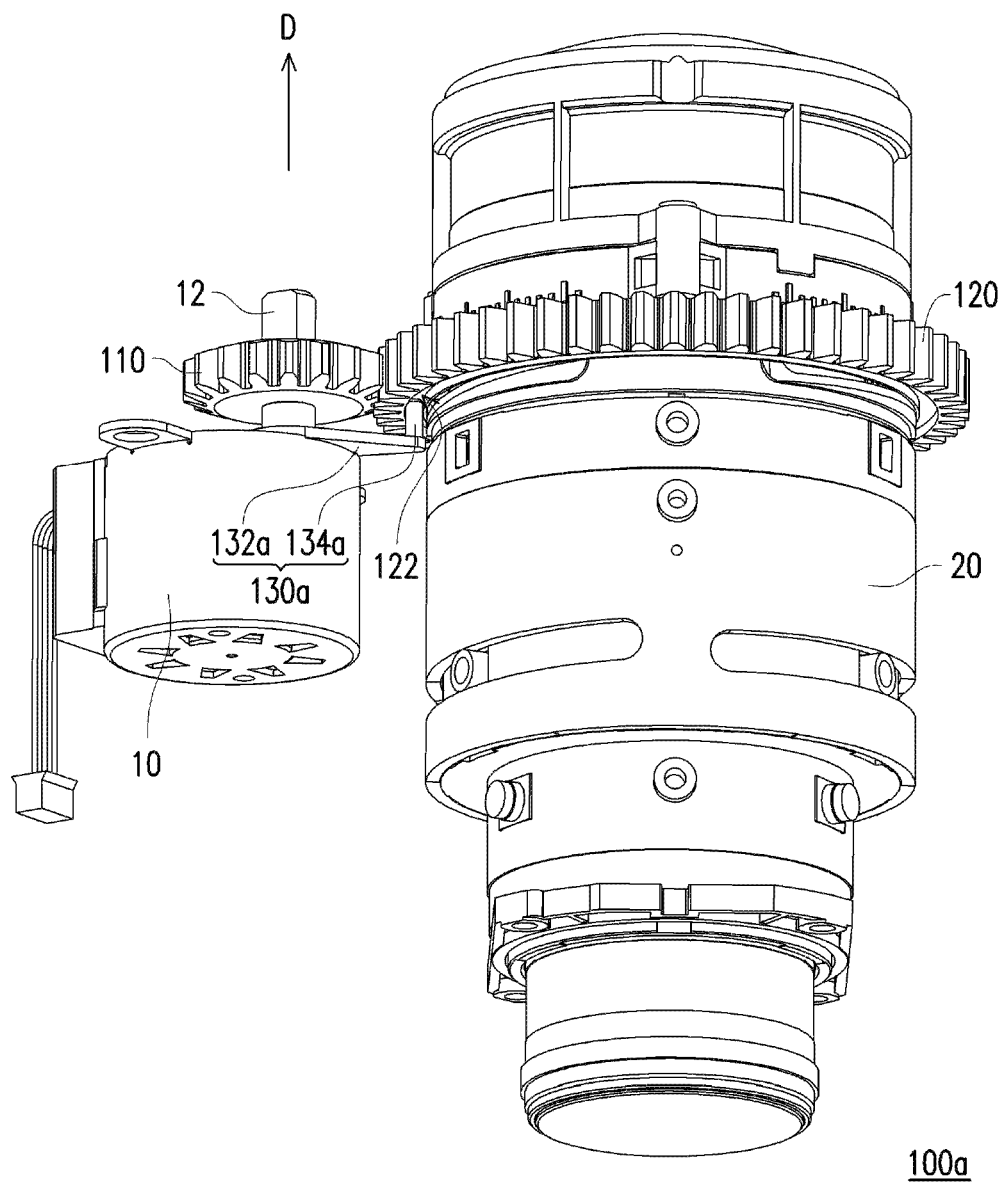
FIG. 1A is a three-dimensional schematic view of a gear-skipping prevention mechanism and a relative position between a first object and a second object according to an embodiment of the disclosure.
Figure 1B:
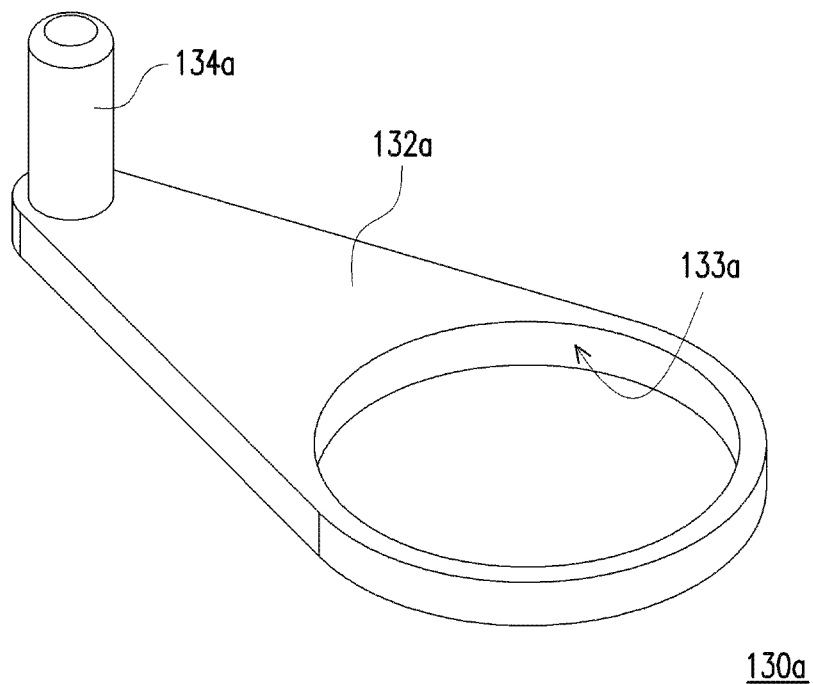
FIG. 1B is a three-dimensional schematic view of a positioning member of the gear-skipping prevention mechanism of FIG. 1A.
Figure 1C:
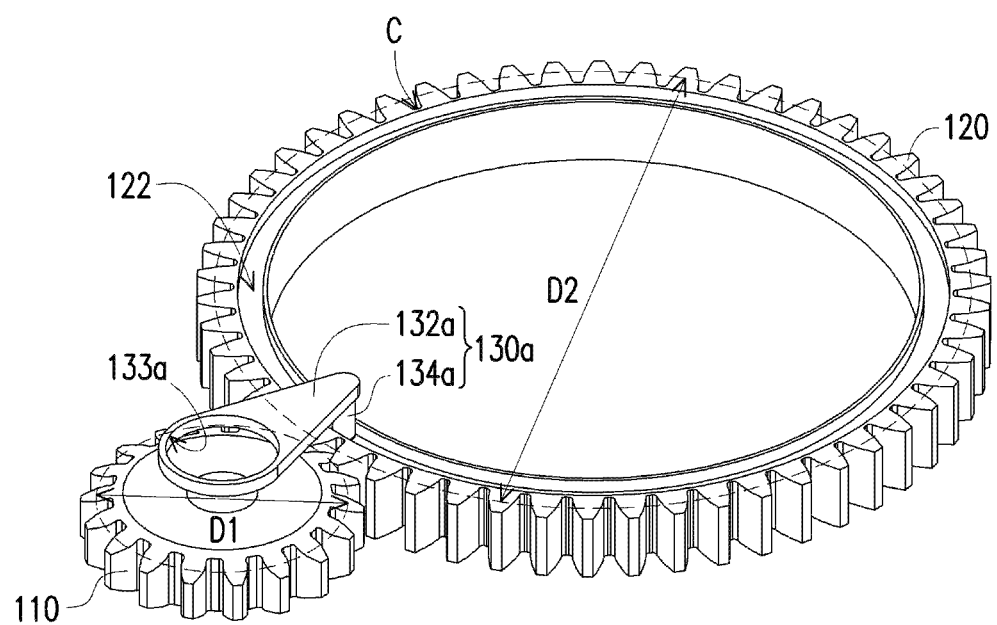
FIG. 1C is a three-dimensional enlargement schematic view of a first gear, a second gear, and the positioning member of the gear-skipping prevention mechanism of FIG. 1A from another viewing angle.

FIG. 1A is a three-dimensional schematic view of a gear-skipping prevention mechanism and a relative position between a first object and a second object according to an embodiment of the disclosure. FIG. 1B is a three-dimensional schematic view of a positioning member of the gear-skipping prevention mechanism of FIG. 1A. FIG. 1C is a three-dimensional enlargement schematic view of a first gear, a second gear, and the positioning member of the gear-skipping prevention mechanism of FIG. 1A from another viewing angle.

With reference to FIG. 1A, FIG. 1B, and FIG. 1C together, in this embodiment, a gear-skipping prevention mechanism 100a includes a first gear 110, a second gear 120, and a positioning member 130a. The first gear 110 is sleeved on an axle 12. The second gear 120 meshes with the first gear 110 and has a first guiding groove 122. The positioning member 130a includes at least one body 132a (one is schematically shown) and at least one engaging portion 134a (one is schematically shown). Each of the at least one body 132a has a sleeving hole 133a. The sleeving hole 133a is sleeved on the axle 12, and each of the at least one engaging portion 134a is slidably disposed in the first guiding groove 122 of the second gear 120 to limit a relative position between the first gear 110 and the second gear 120.

To be specific, with reference to FIG. 1A and FIG. 1C together, a first object 10 includes the axle 12, and the first gear 110 and the sleeving hole 133a of the body 132a of the positioning member 130a are both sleeved on the axle 12. From another perspective, the second gear 120 is sleeved on the second object 20. Herein, one of the first object 10 and the second object 20 is a driving motor, and the other one of the first object 10 and the second object 20 is a lens module. Preferably, the first object 10 is, but not limited to, a driving motor, and the second object 20 is, but not limited to, a lens module, for example. That is, in this embodiment, the first object 10 may drive the first gear 110 to drive the second gear 120 to rotate.

Further, with reference to FIG. 1C again, in this embodiment, the first guiding groove 122 of the second gear 120 is disposed along a dedendum circle of the second gear 120. Herein, the first guiding groove 122 is implemented as a concave groove. In another embodiment, the first guiding groove 122 of the second gear 120 may be disposed closes to a concentric circle of a center along a body of the second gear 120. Further, the body 132a of the positioning member 130a may extend towards the center of the second gear 120. In this way, the engaging portion 134a is slidably disposed in the first guiding groove 122 of the second gear 120 to limit the relative position between the first gear 110 and the second gear 120.

A pitch diameter D1 and a number of teeth of the first gear 110 are both less than a pitch diameter D2 and a number of teeth of the second gear 120. That is, a size of the first gear 110 is less than a size of the second gear 120. In another embodiment, the pitch diameter D1 and the number of teeth of the first gear 110 are both greater than the pitch diameter D2 and the number of teeth of the second gear 120.

Besides, with reference to FIG. 1A and FIG. 1B again, in this embodiment, the body 132a and the engaging portion 134a of the positioning member 130a are implemented to be, but not limited to, an integrally-formed structure. Herein, a material of the positioning member 130a is, but not limited to, metal. As shown in FIG. 1A, an extension direction of the engaging portion 134a of the positioning member 130a is substantially parallel to an extension direction D of the axle 12. That is, the extension direction D of an axle center of the axle 12 is parallel to the extension direction of the engaging portion 134a.

The sleeving hole 133a of body 132a of the positioning member 130a provided by this embodiment is sleeved on the axle 12 sleeved by the first gear 110. Further, the engaging portion 134a of the positioning member 130a is slidably disposed in the first guiding groove 122 of the second gear 120 to accordingly limit the relative position between the first gear 110 and the second gear 120. That is, in the gear-skipping prevention mechanism 100a provided by this embodiment, a distance between the first gear 110 and the second gear 120 is fixed through the positioning member 130a to prevent interference caused by an excessively small tooth spacing or to prevent gear skipping caused by an excessively large tooth spacing from occurring. In addition, compared to the related art in which a rigid member (e.g., a sheet metal piece) is used to fix a motor device onto a lens, the positioning member 130a provided by this embodiment exhibits a small volume, so that a volume of a product as a whole is not affected.

It should be noted that the reference numerals and a part of the contents in the previous embodiment are used in the following embodiments, in which identical reference numerals indicate identical or similar components, and repeated description of the same technical contents is omitted. Please refer to the descriptions of the previous embodiments for the omitted contents, which will not be repeated hereinafter.

Figure 2A:
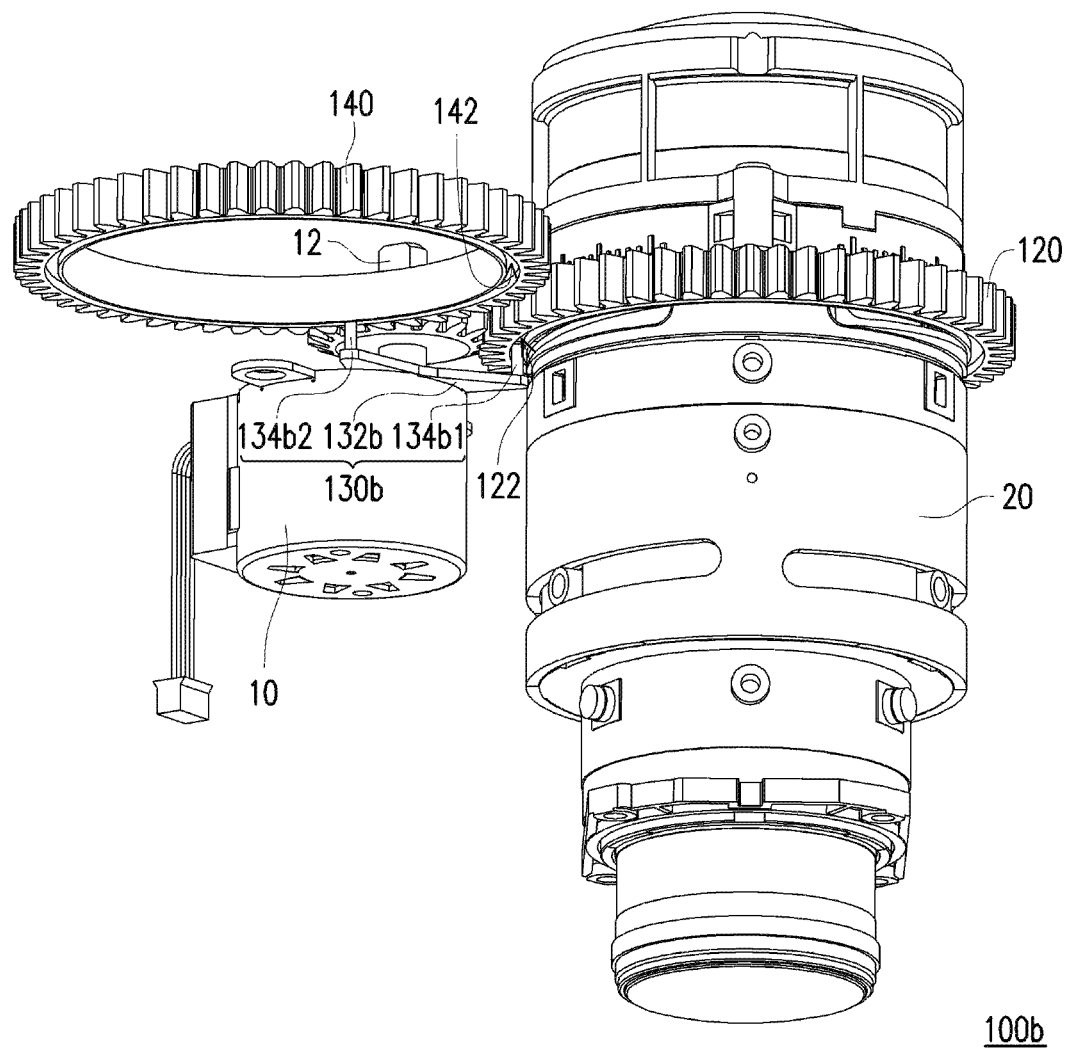
FIG. 2A is a three-dimensional schematic view of a gear-skipping prevention mechanism and a relative position between a first object and a second object according to another embodiment of the disclosure.
Figure 2B:
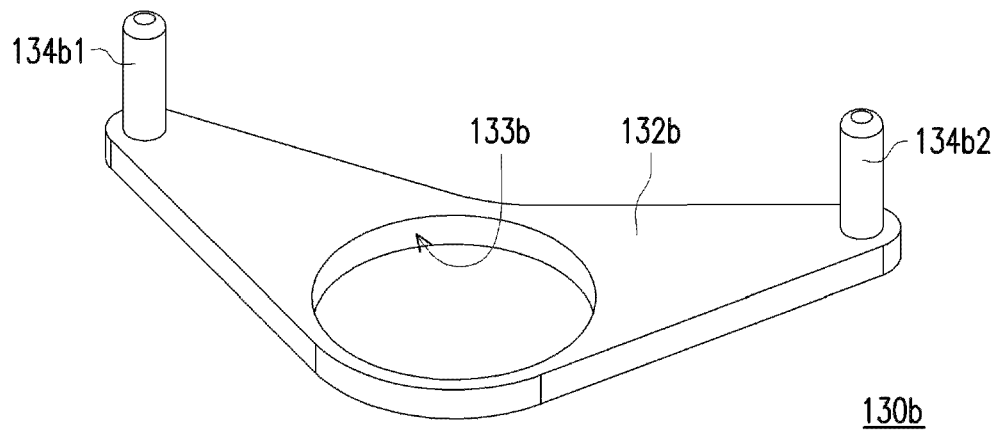
FIG. 2B is a three-dimensional schematic view of a positioning member of the gear-skipping prevention mechanism of FIG. 2A.
Figure 2C:
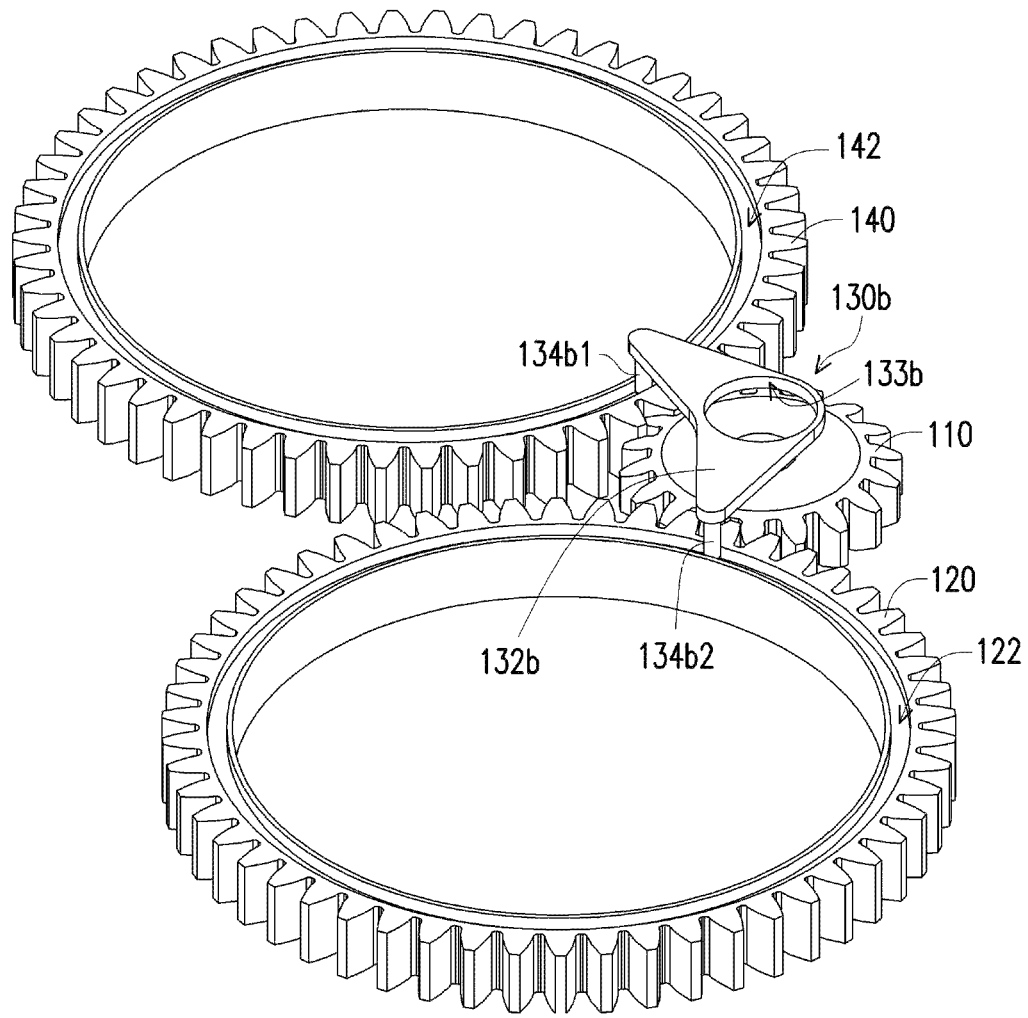
FIG. 2C is a three-dimensional enlargement schematic view of a first gear, a second gear, and the positioning member of the gear-skipping prevention mechanism of FIG. 2A from another viewing angle.

FIG. 2A is a three-dimensional schematic view of a gear-skipping prevention mechanism and a relative position between a first object and a second object according to another embodiment of the disclosure. FIG. 2B is a three-dimensional schematic view of a positioning member of the gear-skipping prevention mechanism of FIG. 2A. FIG. 2C is a three-dimensional enlargement schematic view of a first gear, a second gear, and the positioning member of the gear-skipping prevention mechanism of FIG. 2A from another viewing angle.

With reference to FIG. 1A, FIG. 1B, FIG. 2A, and FIG. 2B first, a gear-skipping prevention mechanism 100b provided by this embodiment is similar to the gear-skipping prevention mechanism 100a provided by the foregoing embodiments, and a difference therebetween is that: the gear-skipping prevention mechanism 100b further includes a third gear 140 in this embodiment. The third gear 140 meshes with the first gear 110 and has a second guiding groove 142. Herein, the third gear 140 is configured to be sleeved on a third object (not shown). The third object is, but not limited to, an instruction module, for example. When the first gear 110 simultaneously drives the second gear 120 and the third gear 140, the third gear 140 may be used to adjust a numerical value related to the first gear 140 in the instruction module. Moreover, a proportional relationship is provided between the second gear 120 and the third gear 140. To be specific, the instruction numerical value may be used to instruct a distance or an aperture value and the like, so that the instruction module may obtain and then display an actual value to a user. In another embodiment, the first object and the third object may form a multi-gear driver object. The first object is, but not limited to, a conveyor belt, and the third object is, but not limited to, a valve on the conveyor belt, for example. The valve may be opened or closed according to the proportional relationship between the second gear 120 and the third gear 140.

To be more specific, with reference to FIG. 2A, FIG. 2B, and FIG. 2C together, in this embodiment, at least one engaging portion of a positioning member 130b includes a first engaging portion 134b1 and a second engaging portion 134b2. The first engaging portion 134b1 is slidably disposed in the first guiding groove 122 of the second gear 120 to limit the relative position between the first gear 110 and the second gear 120. The second engaging portion 134b2 is slidably disposed in the second guiding groove 142 of the third gear 140 to limit a relative position between the first gear 110 and the third gear 140. Herein, each of the first guiding groove 122 of the second gear 120 and the second guiding groove 142 of the third gear 140 is implemented as a concave groove. A sleeving hole 133b of a body 132b of the positioning member 130b is located between the first engaging portion 134b1 and the second engaging portion 134b2.

In this embodiment, the positioning member 130b has the first engaging portion 134b1 and the second engaging portion 134b2. As such, the first gear 110 may simultaneously drive the second gear 120 and the third gear 140 to rotate and may simultaneously limit the relative position between the first gear 110 and the second gear 120 and the relative position between the first gear 110 and the third gear 140 to prevent gear skipping from occurring. In other words, corresponding engaging portions may be correspondingly disposed on the positioning member according to a number of gears required to be driven, and guiding grooves are disposed on the gears required to be driven. In this way, gear skipping is prevented from occurring through arrangement of such positioning member.

Figure 3A:
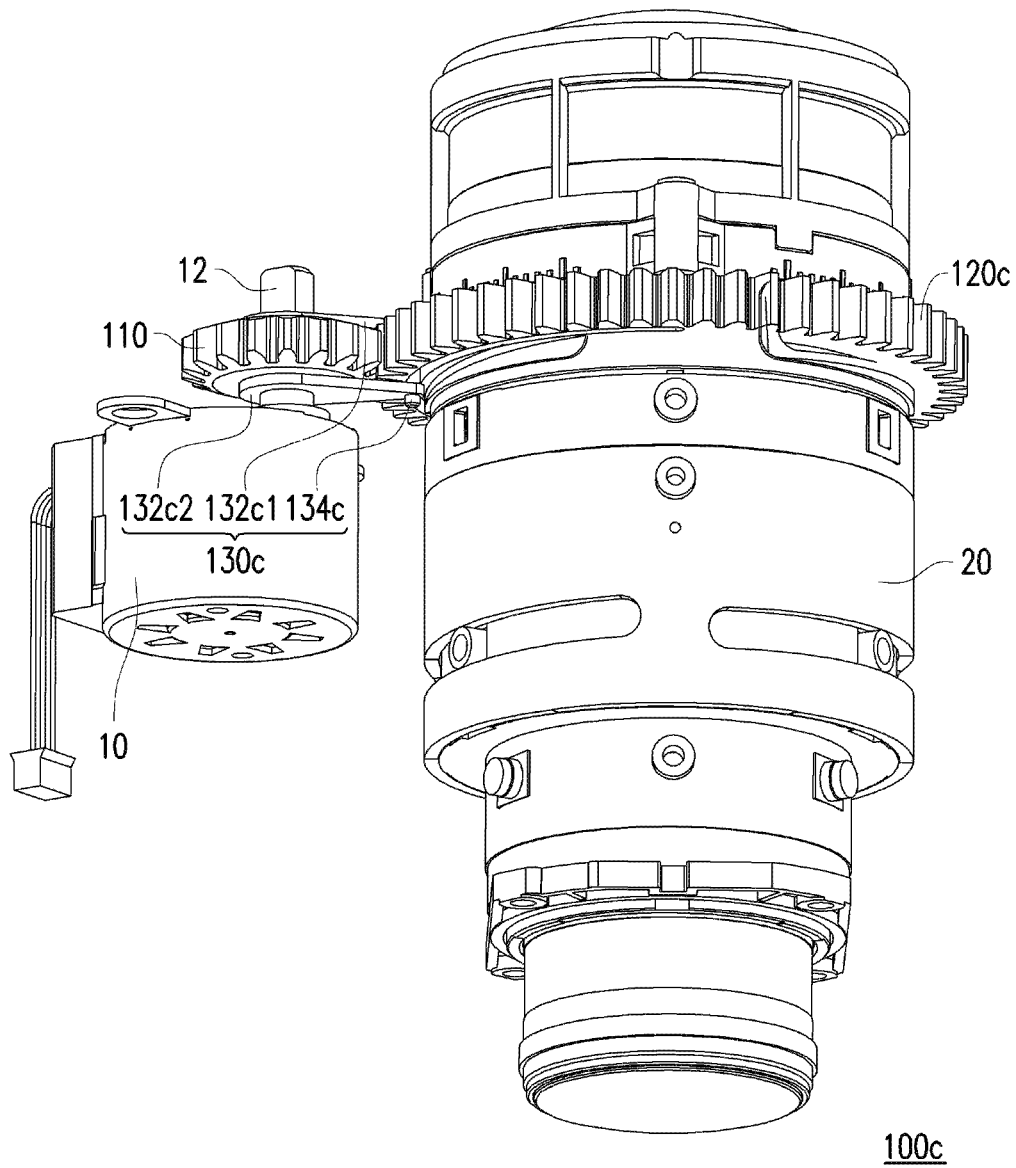
FIG. 3A is a three-dimensional schematic view of a gear-skipping prevention mechanism and a relative position between a first object and a second object according to another embodiment of the disclosure.
Figure 3B:
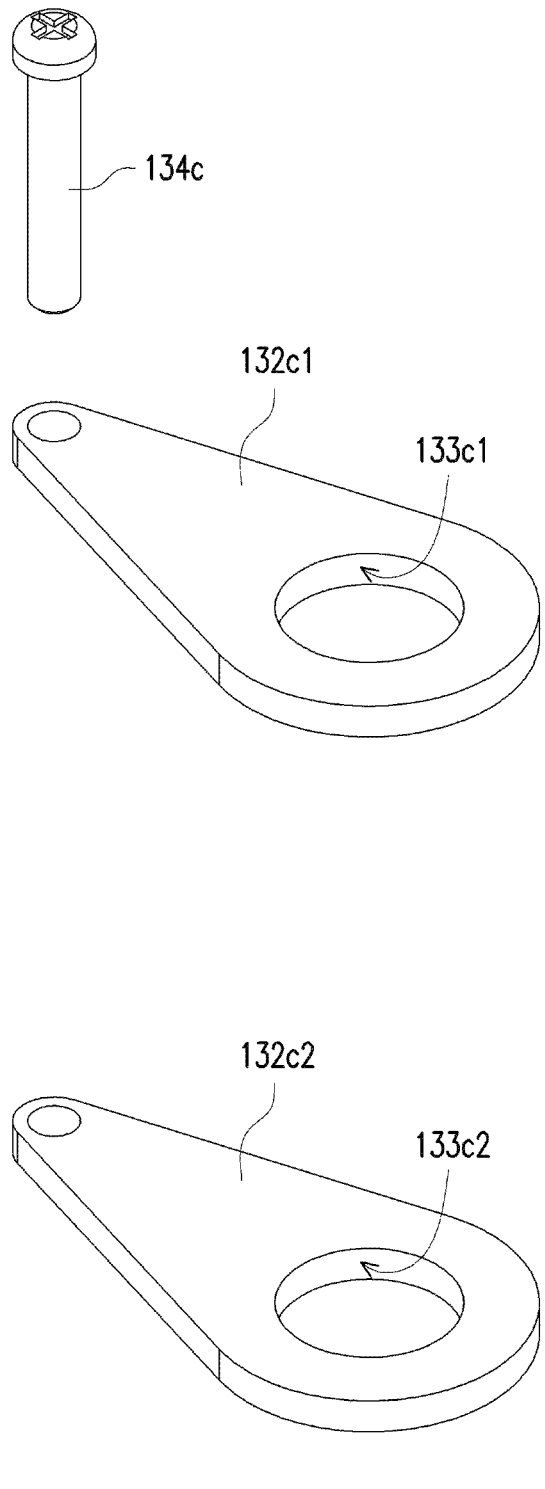
FIG. 3B is a three-dimensional exploded schematic view of a positioning member of the gear-skipping prevention mechanism of FIG. 3A.
Figure 3C:
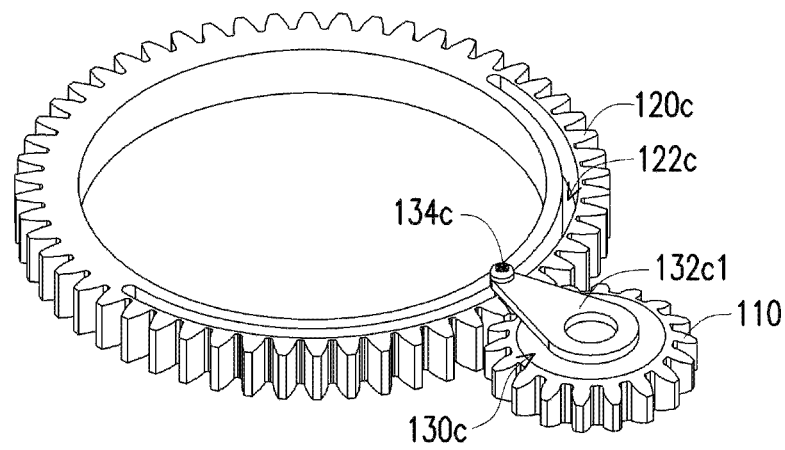
FIG. 3C is a three-dimensional enlargement schematic view of a first gear, a second gear, and the positioning member of the gear-skipping prevention mechanism of FIG. 3A.
Figure 3D:
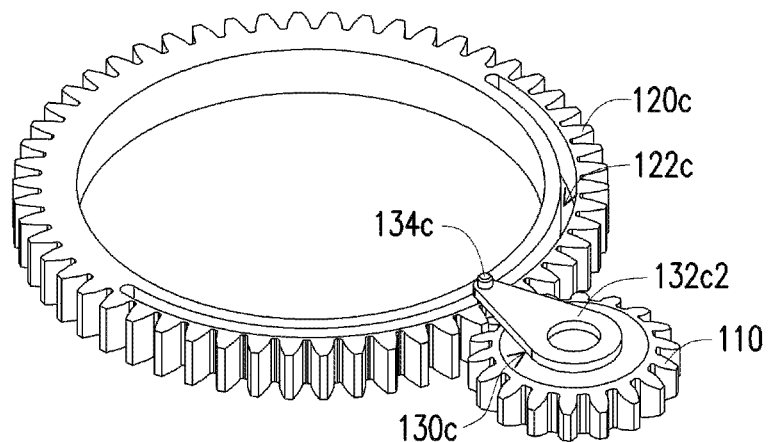
FIG. 3D is a three-dimensional enlargement schematic view of a first gear, a second gear, and the positioning member of the gear-skipping prevention mechanism of FIG. 3A from another viewing angle.

FIG. 3A is a three-dimensional schematic view of a gear-skipping prevention mechanism and a relative position between a first object and a second object according to another embodiment of the disclosure. FIG. 3B is a three-dimensional exploded schematic view of a positioning member of the gear-skipping prevention mechanism of FIG. 3A. FIG. 3C is a three-dimensional enlargement schematic view of a first gear, a second gear, and the positioning member of the gear-skipping prevention mechanism of FIG. 3A. FIG. 3D is a three-dimensional enlargement schematic view of a first gear, a second gear, and the positioning member of the gear-skipping prevention mechanism of FIG. 3A from another viewing angle.

With reference to FIG. 1A, FIG. 1B, FIG. 3A, and FIG. 3B first, a gear-skipping prevention mechanism 100c provided by this embodiment is similar to the gear-skipping prevention mechanism 100a provided by the foregoing embodiments, and a difference therebetween is that: at least one body of a positioning member 130c includes a first body 132c1 and a second body 132c2 in this embodiment. The first body 132c1 and the second body 132c2 are located at two opposite sides of a second gear 120c, and an engaging portion 134c is configured to penetrate through the first body 132c1, the second gear 120c, and the second body 132c2.

To be specific, with reference to FIG. 3A, FIG. 3B, FIG. 3C, and FIG. 3D together, a sleeving hole 133c1 of the first body 132c1 and a sleeving hole 133c2 of the second body 132c2 are both sleeved on the axle 12 sleeved by the first gear 110. Further, the engaging portion 134c penetrates through the first body 132c1, a first guiding groove 122c of the second gear 120c, and the second body 132c2 and is secured between the first body 132c1 and the second body 132c2 to be slidably disposed in the first guiding groove 122c. That is, the first guiding groove 122c of the second gear 120c is implemented as a penetrating groove.

In the present embodiment, the positioning member 130c is limited through mutual locking performed at upper and the lower sides of the second gear 120c. As such, the engaging portion 134c is ensured not to be deformed or displaced when the first gear 110 and the second gear 120c move. In this way, interference caused by an excessively small tooth spacing or gear skipping caused by an excessively large tooth spacing is prevented from occurring, and a small volume is also achieved.

In view of the foregoing, the embodiments of the disclosure have at least one of the following advantages or effects. In the gear-skipping prevention mechanism provided by the disclosure, the sleeving hole of body of the positioning member is sleeved on the axle sleeved by the first gear. Further, the engaging portion of the positioning member is slidably disposed in the first guiding groove of the second gear to accordingly limit the relative position between the first gear and the second gear. That is, in the gear-skipping prevention mechanism provided by the disclosure, the distance between the first gear and the second gear is fixed through the positioning member to prevent interference caused by an excessively small tooth spacing or to prevent gear skipping caused by an excessively large tooth spacing from occurring. In addition, compared to the related art in which a rigid member (e.g., a sheet metal piece) is used to fix a motor device onto a lens, the positioning member provided by this embodiment exhibits a small volume, so that a volume of a product as a whole is not affected.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. A gear-skipping prevention mechanism, comprising a first gear, a second gear, and a positioning member, wherein:
   the first gear is sleeved on an axle,
   the second gear meshes with the first gear and has a first guiding groove, and
   the positioning member comprises at least one body and at least one engaging portion, each of the at least one body has a sleeving hole, wherein the sleeving hole is sleeved on the axle, and each of the at least one engaging portion is slidably disposed in the first guiding groove to limit a relative position between the first gear and the second gear,
   wherein a first object comprises the axle, and the second gear is sleeved on a second object, and one of the first object and the second object is a driving motor, and the other one of the first object and the second object is a lens module.

2. The gear-skipping prevention mechanism according to claim 1, wherein the first guiding groove is disposed along a dedendum circle of the second gear.

3. The gear-skipping prevention mechanism according to claim 1, wherein a pitch diameter and a number of teeth of the first gear are both less than a pitch diameter and a number of teeth of the second gear.

4. The gear-skipping prevention mechanism according to claim 1, wherein an extension direction of the axle is parallel to an extension direction of each of the at least one engaging portion.

5. A gear-skipping prevention mechanism, comprising a first gear, a second gear, a third gear, and a positioning member, wherein:
   the first gear is sleeved on an axle,
   the second gear meshes with the first gear and has a first guiding groove,
   the positioning member comprises at least one body and at least one engaging portion, each of the at least one body has a sleeving hole, wherein the sleeving hole is sleeved on the axle, and each of the at least one engaging portion is slidably disposed in the first guiding groove to limit a relative position between the first gear and the second gear, and
   the third gear meshes with the first gear and has a second guiding groove, wherein the at least one engaging portion comprises a first engaging portion and a second engaging portion, the first engaging portion is slidably disposed in the first guiding groove of the second gear to limit the relative position between the first gear and the second gear, and the second engaging portion is slidably disposed in the second guiding groove of the third gear to limit a relative position between the first gear and the third gear.

6. The gear-skipping prevention mechanism according to claim 5, wherein the sleeving hole of the at least one body is located between the first engaging portion and the second engaging portion.

7. A gear-skipping prevention mechanism, comprising a first gear, a second gear, and a positioning member, wherein:
   the first gear is sleeved on an axle,
   the second gear meshes with the first gear and has a first guiding groove,
   the positioning member comprises at least one body and at least one engaging portion, each of the at least one body has a sleeving hole, wherein the sleeving hole is sleeved on the axle, and each of the at least one engaging portion is slidably disposed in the first guiding groove to limit a relative position between the first gear and the second gear, and
   the at least one body and the at least one engaging portion of the positioning member are integrally formed.

8. A gear-skipping prevention mechanism, comprising a first gear, a second gear, and a positioning member, wherein:
   the first gear is sleeved on an axle,
   the second gear meshes with the first gear and has a first guiding groove,
   the positioning member comprises at least one body and at least one engaging portion, each of the at least one body has a sleeving hole, wherein the sleeving hole is sleeved on the axle, and each of the at least one engaging portion is slidably disposed in the first guiding groove to limit a relative position between the first gear and the second gear, and
   the at least one body of the positioning member comprises a first body and a second body, the first body and the second body are located at two opposite sides of the second gear, and the at least one engaging portion penetrates through the first body, the first guiding groove of the second gear, and the second body to be secured between the first body and the second body and to be slidably disposed in the first guiding groove.

* * * * *